United States Patent Office
3,717,441
Patented Feb. 20, 1973

3,717,441
LOW EXPANSION ALUMINOSILICATE GLASS COMPOSITIONS COMPRISING A PENTAVALENT METAL OXIDE
Charles F. Rapp, Toledo, Ohio, assignor to Owens-Illinois, Inc.
No Drawing. Filed Mar. 30, 1971, Ser. No. 129,571
Int. Cl. B01j 3/00; C03c 3/04
U.S. Cl. 23—292                                        20 Claims

ABSTRACT OF THE DISCLOSURE

Low thermal expansion glass compositions based on a ternary glass system comprising $SiO_2$-$Al_2O_3$-$R_2O_5$, where R is a pentavalent metal, such as vanadium, niobium and tantalum, having an atomic radius of about 1.34 to 1.46 A. and an ionic radius of about 0.59 to 0.73 A., or mixtures thereof. Equimolar substitution of $SiO_2$ in the above ternary system with a stabilizer compound, such as $B_2O_3$ or $AlPO_4$, has been found to enhance the resistance of the glasses of this invention to phase separation. The low termal expansion glasses of this invention can be readily formed at temperatures below 1700° C. using conventional techniques, and are useful in the preparation of thermal shock-resistant glassware and low expansion reflective mirror blanks.

BACKGROUND OF THE INVENTION

This invention relates to glass compositions, processes for their preparation, and articles of manufacture prepared therefrom.

Glass compositions which have low thermal expansion characteristics exhibit only minor dimensional changes when exposed to abrupt and wide variations in temperature. Compositions having such properties have been widely used in the manufacture of thermal shock-resistant glassware for both the home and industry. Up to now, the preparation of such glassware has been somewhat difficult because of the problems encountered in the melting and forming of such compositions. I have discovered a glass system which can be melted and formed with relative ease at temperatures ranging from 1500 to 1700° C. with conventional manufacturing equipment.

My ternary glass system yields glass compositions which have coefficients of thermal expansion in the range of 10 to $22 \times 10^{-7}$/° C., can be easily formed into thermal shock-resistant glassware and low expansion mirror blanks, and are essentially free of both borates and alkali or alkaline earth metal oxides.

SUMMARY OF THE INVENTION

This invention is a ternary glass system, having a coefficient of thermal expansion in the range of about 10 to $22 \times 10^{-7}$/° C. and capable of being formed at temperatures ranging from about 1500 to 1700° C., which comprises the following ingredients in the approximate mole percentages:

| Ingredient: | Mole percent |
|---|---|
| $SiO_2$ | 60.0–90.0 |
| $Al_2O_3$ | 5.0–20.0 |
| $R_2O_5$ | 5.0–20.0 | where R is a pentavalent metal, such as vanadium, niobium and tantalum, having an atomic radius of about 1.34 to 1.46 A. and an ionic radius of about 0.59 to 0.73 A., or mixtures thereof.

In one of the preferred embodiments of my invention, an equimolar amount of a stabilizer compound, such as $B_2O_3$ and $AlPO_4$, is substituted for $SiO_2$ to produce low thermal expansion glasses having enhanced resistance to phase separation.

Compositions which have both low thermal expansion and enhanced resistance to phase separation comprise the following ingredients in the approximate mole percentages:

| Ingredient: | Mole percent |
|---|---|
| $SiO_2$ | 40.0–89.0 |
| $Al_2O_3$ | 5.0–20.0 |
| $R_2O_5$ | 5.0–20.0 |
| X | 1.0–20.0 | where R is a pentavalent metal as defined previously, and X is a stabilizer compound, such as $B_2O_3$ and $AlPO_4$.

In both the basic ternary and stabilized glass systems of this invention, the ratio of $Al_2O_3$ to $R_2O_5$ should be maintained at 1:1 or slightly greater. The most preferred glass systems of this invention have $Al_2O_3$:$R_2O_5$ ratios ranging from about 1 to 1.3:1.

This invention also includes a process for the preparation of low thermal expansion glasses, and articles of manufacture formed thereby.

DESCRIPTION OF THE INVENTION INCLUDING PREFERRED EMBODIMENTS

This invention is directed toward glass compositions based on the ternary glass system, $SiO_2$-$Al_2O_3$-$R_2O_5$, and stabilized ternary glass systems.

Basic ternary glass systems

The basic glass system of this invention comprises approximately 60.0 to 90.0 mole percent $SiO_2$, 5.0 to 20.0 mole percent $Al_2O_3$ and 5.0 to 20.0 mole percent $R_2O_5$, where R is a pentavalent metal, such as one of those in Group V–B of the Periodic Table of Elements, namely V, Nb and Ta, having an atomic radius of about 1.34 to 1.46 A. and an ionic radius of about 0.59 to 0.73 A., or mixtures thereof.

Compositions having the above three basic ingredients in the following approximate proportions have somewhat lower coefficient of thermal expansion and are, therefore, preferred over the other basic ternary glasses of this invention:

| Ingredient: | Mole percent |
|---|---|
| $SiO_2$ | 80.0–85.0 |
| $Al_2O_3$ | 7.5–12.5 |
| $R_2O_5$ | 7.5–10.0 | where R is the same as previously defined.

Stabilized ternary glass system

A limited number of the basic ternary glass systems described above tend to phase separate during their preparation into glass articles. I have found that the substitution of an equimolar amount of a stabilizer compound, such as $AlPO_4$, or $B_2O_3$, for $SiO_2$ in the basic composition helps to eliminate or reduce the frequency of such faults in the preparation of these glasses.

Stabilized ternary glass systems which have both low coefficients of thermal expansion and reduced frequency of phase separation comprise approximately 40.0 to 89.0 mole percent $SiO_2$, 5.0 to 20.0 mole percent $Al_2O_3$, 5.0 to 20.0 $R_2O_5$ where R is the same as previously defined, and 1.0 to 20.0 mole percent X, where X is a stabilizer compound such as $B_2O_3$ and $AlPO_4$.

In one of the preferred embodiments of this invention, the ingredients of a $B_2O_3$ stabilized ternary glass system have the approximate mole percentages:

| Ingredient: | Mole percent |
|---|---|
| $SiO_2$ | 72.5–80.0 |
| $Al_2O_3$ | 2.5–12.5 |
| $Ta_2O_5$ | 5.0–7.5 |
| $B_2O_3$ | 5.0–15.0 |

In another of the preferred stabilized glass systems of this invention, the following ingredients have the approximate mole percentages:

| Ingredient: | Mole percent |
|---|---|
| $SiO_2$ | 55.0–75.0 |
| $Al_2O_3$ | 10.0–15.0 |
| $Ta_2O_5$ | 5.0–15.0 |
| $AlPO_4$ | 10.0–15.0 |

In both the basic and stabilized ternary glass systems of this invention, those compositions where R is niobium, tantalum or vanadium are preferred; with R being tantalum in the most preferred embodiments of thise invention.

Glass systems containing equimolar amounts of $Al_2O_3$ and $R_2O_5$ are preferred, and glass systems containing slightly in excess of $Al_2O_3$ to $R_2O_5$ are most preferred because of their resistance to phase separation. The relative proportions of the pentavalent metal oxides to one another in those glass systems containing mixtures of two or more of such metal oxides is not critical as long as their total content vis-a-vis the other elements of the glass system remains unchanged.

The addition of stabilizer to the ternary glass compositions, already having low coefficients of thermal expansion appears to lower their coefficients even further in addition to enhancing the glass' resistance to phase separation. This combined or synergistic effect of the stabilizer and pentavalent metal oxide can best be exemplified by reference to the following table:

TABLE I

| Sample No. | $SiO_2$ | $Al_2O_3$ | $AlPO_4$ | $Ta_2O_5$ | $\alpha \times 10^7$ |
|---|---|---|---|---|---|
| 1(a) | 80.0 | 10.0 |  | 10.0 | 14.2 |
| 1(b) | 70.0 | 10.0 | 10.0 | 10.0 | 11.3 |
| 2(a) | 75.0 | 15.0 |  | 10.0 | 16.7 |
| 2(b) | 65.0 | 15.0 | 10.0 | 10.0 | 12.7 |
| 3(a) | 70.0 | 15.0 |  | 15.0 | 20.5 |
| 3(b) | 60.0 | 15.0 | 10.0 | 15.0 | 14.7 |

NOTE.—Values are expressed in terms of mole percent.

The equimolar substitution of $SiO_2$ with $AlPO_4$ in 1(b), 2(b) and 3(b) appears to indicate a type of synergism between these two compounds.

Glass composition preparation

Ingredients: A number of the various ingredients that are used to form the glass systems of this invention can be originally combined in the crucible in the form of oxides, carbonates or other precursor compounds.

For example, the stabilizer aluminum phosphate can be added to the melt as $AlPO_4$ or be generated in situ by the addition of stoichiometric amounts of $Al_2O_3$ and $(NH_4)_3PO_4$ or $Al_2O_3$ and $P_2O_5$.

All the ingredients of both the basic and stabilized glass systems of this invention are available as reagent grade chemicals and do not require any special or elaborate preparation.

Of course, functionally insignificant amounts of other ingredients can be present as impurities in the glass systems of this invention, provided, however, that they do not have any appreciable effect on the coefficient of thermal expansion, high temperature viscosity, or other critical properties of the compositions. With regard to this last point, special care should be exercised to ensure that the compositions are kept as free of alkali and alkali-metal earth oxides as possible.

Process: The following process can be used in the preparation of both the basic and stabilized glass systems of this invention, with the only minor variation being the composition of ingredients undergoing the process.

In accordance with this invention, low thermal expansion glasses can be prepared from the previously-described glass systems in the following manner:

(a) The ingredients are initially combined by mixing them in the appropriate proportions in a platinum crucible. The order of addition is not critical and mixing prior to melting is only a device to facilitate the melting process.

(b) After the ingredients are intimately admixed, the crucible containing the admixture is placed in an electric muffle furnace, where it is heated in an air environment under normal pressure to a temperature ranging from about 1500 to 1700° C. until the melt appears fluid and uniform. During preparation of the melt, the contents of the crucible can be stirred periodically to ensure homogeneity.

(c) After the melt is prepared, it can be formed into useful shapes by standard pressing or casting techniques.

(d) Once the glass is formed, it is cooled to about 700 to 900° C., and maintained at this temperature where it is slowly annealed for a period of at least 1 hour.

(e) Cooling the glass sample follows annealing, and can be accomplished by either turning the annealing furnace off and permitting the sample to gradually cool to room temperature or by removal of the sample from the furnace.

The coefficients of thermal expansion of the glasses are then measured over a temperature range of from 0 to 300° C. on a Quartz Tube Dilatometer, according to ASTM Designation No. C337–57 (1965) and their mean values recorded.

Properties and utility

The glasses prepared from the above glass systems by the process of this invention are, with the exception of the vanadium glasses, transparent to visible light. All of the vanadium glasses are black, a property which further complicates the evaluation of the quality of these glasses since it makes detection of phase separation very diffcult.

All of the glasses of this invention are resistant to large dimensional changes upon exposure to abrupt and wide variations in temperature owing to the fact that they have coefficients of thermal expansion ranging from 10 to $22 \times 10^{-7}/°$ C.

Glasses prepared from the compositions of this invention, unlike many of the thermal shock-resistant glasses, have high temperature viscosities which permit melting and forming by standard methods and with standard equipment.

Because these glasses are resistant to dimensional change with changes in temperature, they are useful in the preparation of thermal shock-resistant glassware for industrial and home use and in the preparation of low expansion reflective mirror blanks for telescopic devices.

The following examples further illustrate the compositions and processes of this invention. Parts and percentages where used in these examples are by weight unless otherwise stipulated.

EXAMPLE I

A glass article, having a coefficient of thermal expansion of $13.2 \times 10^{-7}/°$ C. is prepared as follows:

Two hundred grams of a formulation comprising 80.0 mole percent $SiO_2$ ("Amersil Type F," Amersil, Inc., Hillside, N.J.), 12.5 mole percent $Al_2O_3$, and 7.5 mole percent $Ta_2O_5$ are heated in a platinum crucible in an electric muffle furnace in an air atmosphere and under normal pressure at a temperature of approximately 1600° C. until uniformly melted. The formulation is occasionally stirred during heating in order to facilitate and ensure homogeneity of the melt.

After the contents of the crucible appear fluid and uniform, they are cast into a mold in the form of discs 1.5" in diameter and ½" thick, cooled to about 700° C. and annealed at that temperature for approximately 1 hour. The annealing furnace is turned off and discs permitted to cool to room temperature.

EXAMPLE II

A glass article, having a coefficient of thermal expansion of $16.8 \times 10^{-7}/°$ C., is prepared from the following ingredients in the manner described in Example I:

| Ingredients: | Mole percent |
| --- | --- |
| $SiO_2$ | 85.0 |
| $Al_2O_3$ | 7.5 |
| $V_2O_5$ | 7.5 |

EXAMPLE III

A glass article, having a coefficient of thermal expansion of $16.5 \times 10^{-7}/°$ C., is prepared from the following ingredients in the manner described in Example I:

| Ingredients: | Mole percent |
| --- | --- |
| $SiO_2$ | 80.0 |
| $Al_2O_3$ | 10.0 |
| $Nb_2O_5$ | 10.0 |

EXAMPLE IV

A glass article, having a coefficient of thermal expansion of $20.5 \times 10^{-7}/°$ C., is prepared from the following ingredients in the manner described in Example I:

| Ingredients: | Mole percent |
| --- | --- |
| $SiO_2$ | 70.0 |
| $Al_2O_3$ | 15.0 |
| $Ta_2O_5$ | 15.0 |

EXAMPLE V

A glass article, having a coefficient of thermal expansion of $16.8 \times 10^{-7}/°$ C., is prepared from the following ingredients in the maner described in Example I:

| Ingredients: | Mole percent |
| --- | --- |
| $SiO_2$ | 80.0 |
| $Al_2O_3$ | 12.5 |
| $Nb_2O_5$ | 7.5 |

EXAMPLE VI

A glass article, having a coefficient of thermal expansion of $20.3 \times 10^{-7}/°$ C., is prepared from the following ingredients in the manner described in Example I:

| Ingredients: | Mole percent |
| --- | --- |
| $SiO_2$ | 75.0 |
| $Al_2O_3$ | 15.0 |
| $V_2O_5$ | 10.0 |

EXAMPLE VII

A glass article, having a coefficient of thermal expansion of $13.4 \times 10^{-7}/°$ C., and enhanced resistance to phase separation, is prepared from the following ingredients in the manner described in Example I:

| Ingredients: | Mole percent |
| --- | --- |
| $SiO_2$ | 80.0 |
| $Al_2O_3$ | 10.0 |
| $Ta_2O_5$ | 5.0 |
| $B_2O_3$ | 5.0 |

EXAMPLE VIII

A glass article, having a coefficient of thermal expansion of $13.9 \times 10^{-7}/°$ C., and enhanced resistance to phase separation, is prepared from the following ingredients in the manner described in Example I:

| Ingredients: | Mole percent |
| --- | --- |
| $SiO_2$ | 55.0 |
| $Al_2O_3$ | 15.0 |
| $Ta_2O_5$ | 15.0 |
| $AlPO_4$ | 15.0 |

EXAMPLE IX

A glass article, having a coefficient of thermal expansion of $11.3 \times 10^{-7}/°$ C., and enhanced resistance to phase separation, is prepared from the following ingredients in the manner described in Example I:

| Ingredients: | Mole percent |
| --- | --- |
| $SiO_2$ | 70.0 |
| $Al_2O_3$ | 10.0 |
| $Ta_2O_5$ | 10.0 |
| $AlPO_4$ | 10.0 |

EXAMPLE X

A glass article, having a coefficient of thermal expansion of $18.3 \times 10^{-7}/°$ C., and enhanced resistance to phase separation, is prepared from the following ingredients in the manner described in Example I:

| Ingredients: | Mole percent |
| --- | --- |
| $SiO_2$ | 72.5 |
| $Al_2O_3$ | 12.5 |
| $Ta_2O_5$ | 5.0 |
| $B_2O_3$ | 10.0 |

EXAMPLE XI

A glass article, having a coefficient of thermal expansion of $10.1 \times 10^{-7}/°$ C., and enhanced resistance to phase separation, is prepared from the following ingredients in the manner described in Example I:

| Ingredients: | Mole percent |
| --- | --- |
| $SiO_2$ | 75.0 |
| $Al_2O_3$ | 10.0 |
| $Ta_2O_5$ | 5.0 |
| $AlPO_4$ | 10.0 |

EXAMPLE XII

A glass article, having a coefficient of thermal expansion of $15.9 \times 10^{-7}/°$ C., and enhanced resistance to phase separation, is prepared from the following ingredients in the manner described in Example I:

| Ingredients: | Mole percent |
| --- | --- |
| $SiO_2$ | 80.0 |
| $Al_2O_3$ | 10.0 |
| $Nb_2O_5$ | 5.0 |
| $B_2O_3$ | 5.0 |

EXAMPLE XIII

A glass article, having a coefficient of thermal expansion of $18.0 \times 10^{-7}/°$ C., and enhanced resistance to phase separation, is prepared from the following ingredients in the manner described in Example I:

| Ingredients: | Mole percent |
| --- | --- |
| $SiO_2$ | 77.5 |
| $Al_2O_3$ | 12.5 |
| $Nb_2O_5$ | 5.0 |
| $B_2O_3$ | 10.0 |

EXAMPLE XIV

A glass article, having a coefficient of thermal expansion of $18.7 \times 10^{-7}/°$ C. and enhanced resistance to phase separation is prepared from the following ingredients in the manner described in Example I:

| Ingredients: | Mole percent |
|---|---|
| $SiO_2$ | 55.0 |
| $Al_2O_3$ | 15.0 |
| $Ta_2O_5$ | 7.5 |
| $Nb_2O_5$ | 7.5 |
| $AlPO_4$ | 15.0 |

EXAMPLE XV

A glass article, having a coefficient of thermal expansion of $18.1 \times 10^{-7}/°C.$, and enhanced resistance to phase separation, is prepared from the following ingredients in the manner described in Example I:

| Ingredients: | Mole percent |
|---|---|
| $SiO_2$ | 55.0 |
| $Al_2O_3$ | 15.0 |
| $Ta_2O_5$ | 5.0 |
| $Nb_2O_5$ | 5.0 |
| $V_2O_5$ | 5.0 |
| $AlPO_4$ | 15.0 |

What is claimed is:

1. A glass composition having a coefficient of thermal expansion in the range of about 10 to $22 \times 10^{-7}/°C.$ and capable of being formed at temperatures ranging from about 1500 to 1700° C., the composition being substantially free of alkali metal oxides and alkaline earth metal oxides and consisting essentially of the following ingredients in the approximate mole percentages:

| Ingredients: | Mole percent |
|---|---|
| $SiO_2$ | 60.0–90.0 |
| $Al_2O_3$ | 5.0–20.0 |
| $R_2O_5$ | 5.0–20.0 | where $R_2O_5$ is a Group V–B metal oxide or mixtures thereof.

2. The glass composition as defined in claim 1, wherein the following ingredients have the approximate mole percentages:

| Ingredients: | Mole percent |
|---|---|
| $SiO_2$ | 80.0–85.0 |
| $Al_2O_3$ | 7.5–12.5 |
| $R_2O_5$ | 7.5–10.0 | where $R_2O_5$ is a Group V–B metal oxide.

3. The glass composition as defined in claim 2, wherein R is Ta.

4. The glass composition as defined in claim 3, wherein the following ingredients have the approximate mole percentages:

| Ingredients: | Mole percent |
|---|---|
| $SiO_2$ | 80.0 |
| $Al_2O_3$ | 12.5 |
| $Ta_2O_5$ | 7.5 |

5. The glass composition as defined in claim 2, wherein R is Nb.

6. The glass composition as defined in claim 5, wherein the following ingredients have the approximate mole percentages:

| Ingredients: | Mole percent |
|---|---|
| $SiO_2$ | 80.0 |
| $Al_2O_3$ | 10.0 |
| $Nb_2O_5$ | 10.0 |

7. The glass composition as defined in claim 2, wherein R is V.

8. The glass composition as defined in claim 7, wherein the following ingredients have the approximate mole percentages:

| Ingredients: | Mole percent |
|---|---|
| $SiO_2$ | 85.0 |
| $Al_2O_3$ | 7.5 |
| $V_2O_5$ | 7.5 |

9. The glass composition as defined in claim 2, wherein $Al_2O_3$ and $R_2O_5$ are present in equimolar amounts.

10. A glass composition having a coefficient of thermal expansion in the range of about 10 to $22 \times 10^{-7}/°C.$, ability to be formed at temperatures ranging from about 1500 to 1700° C., and enhanced resistance to phase separation the composition being substantially free of alkali metal oxides and alkaline earth metal oxides and consisting essentially of ingredients in the approximate mole percentages:

| Ingredients: | Mole percent |
|---|---|
| $SiO_2$ | 40.0–89.0 |
| $Al_2O_3$ | 5.0–20.0 |
| $R_2O_5$ | 5.0–20.0 |
| X | 1.0–20.0 | where $R_2O_5$ is a Group V–B metal oxide or mixtures thereof, and X is $B_2O_3$ or $AlPO_4$.

11. The glass composition as defined in claim 10, wherein R is Nb.

12. The glass composition as defined in claim 10, wherein R is V.

13. The glass composition as defined in claim 10, wherein R is Ta.

14. A glass composition having a coefficient of thermal expansion in the range of about 10 to $22 \times 10^{-7}/°C.$, ability to be formed at temperatures ranging from about 1500 to 1700° C., enhanced resistance to phase separation, the composition being substantially free of alkali metal oxides, and alkaline earth metal oxides and consisting essentially of the following ingredients in the approximate mole percentages:

| Ingredients: | Mole percentage |
|---|---|
| $SiO_2$ | 72.5–80.0 |
| $Al_2O_3$ | 2.5–12.5 |
| $Ta_2O_5$ | 5.0–7.5 |
| $B_2O_3$ | 5.0–15.0 |

15. The glass composition as defined in claim 14, wherein the following ingredients have the approximate mole percentages:

| Ingredients: | Mole percent |
|---|---|
| $SiO_2$ | 80.0 |
| $Al_2O_3$ | 10.0 |
| $Ta_2O_5$ | 5.0 |
| $B_2O_3$ | 5.0 |

16. The glass composition as defined in claim 13, wherein the following ingredients have the approximate mole percentages:

| Ingredients: | Mole percent |
|---|---|
| $SiO_2$ | 55.0–80.0 |
| $Al_2O_3$ | 10.0–15.0 |
| $Ta_2O_5$ | 5.0–15.0 |
| $AlPO_4$ | 5.0–15.0 |

17. The glass composition as defined in claim 16, wherein the following ingredients have the approximate mole percentages:

| Ingredients: | Mole percent |
|---|---|
| $SiO_2$ | 75.0 |
| $Al_2O_3$ | 10.0 |
| $Ta_2O_5$ | 5.0 |
| $AlPO_4$ | 10.0 |

18. The glass composition as defined in claim 10, wherein $Al_2O_3$ and $R_2O_5$ are present in equimolar amounts.

19. A shock-resistant article of laboratory glassware consisting essentially of the composition of claim 1.

20. A low expansion reflective mirror blank consisting essentially of the composition of claim 1.

(References on following page)

References Cited

UNITED STATES PATENTS

| | | | |
|---|---|---|---|
| 3,573,939 | 4/1971 | Beall | 106—39 DX |
| 3,043,702 | 7/1962 | Bromer et al. | 106—47 Q |
| 3,113,877 | 12/1963 | Janakirama-Rao | 106—52 |
| 3,150,990 | 9/1964 | Faulstich | 106—47 R |
| 3,480,421 | 11/1969 | Allen | 106—52 X |

FOREIGN PATENTS

| | | | |
|---|---|---|---|
| 1,063,954 | 8/1959 | Germany | 106—54 |

OTHER REFERENCES

Rawson, H.: Inorganic Glass-Forming Systems, London, 1967, pp. 192–3.

Sargent-Welch: Table of Periodic Properties of the Elements, Chicago, 1968 (Ta).

Gravette, N. C. et al.: An Investigation of the System $V_2O_5$–$SiO_2$, in Trans. Brit. Cer. Soc. 65 (1966), [4], pp. 199–206.

Janakirama-Rao, B. Y.: Structure And Mechanism of Conduction of Semiconductor Glasses, in I. Amer. Cer. Soc., 48[6], 1965, pp. 311–19.

CHARLES N. LOVELL, Primary Examiner

W. R. SATTERFIELD, Asistant Examiner

U.S. Cl. X.R.

106—47 Q, 52, 54; 350—288